Feb. 21, 1967   M. WALTERS   3,305,036
DEVICE FOR MEASURING WEIGHT DISTRIBUTION ON A FOOT
Filed Oct. 14, 1965   2 Sheets-Sheet 1

Mitchell Walters
INVENTOR.

BY *Clarence A. O'Brien*
*and Harvey B. Jackson*
Attorneys

Feb. 21, 1967 M. WALTERS 3,305,036
DEVICE FOR MEASURING WEIGHT DISTRIBUTION ON A FOOT
Filed Oct. 14, 1965 2 Sheets-Sheet 2
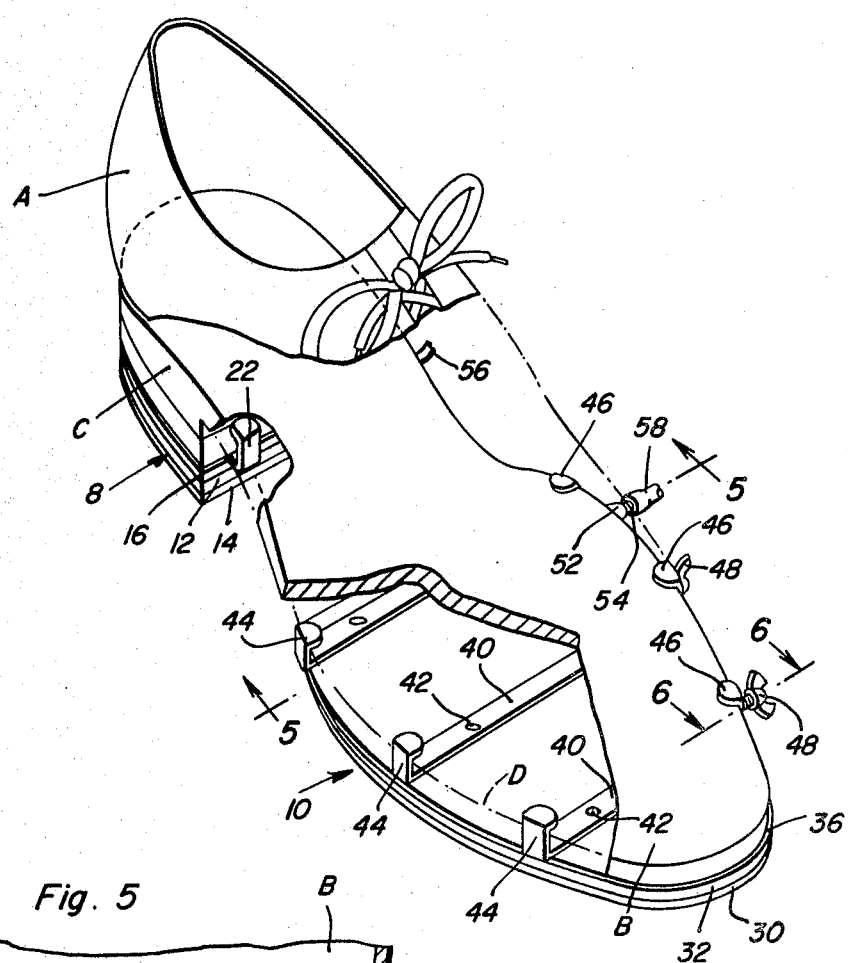
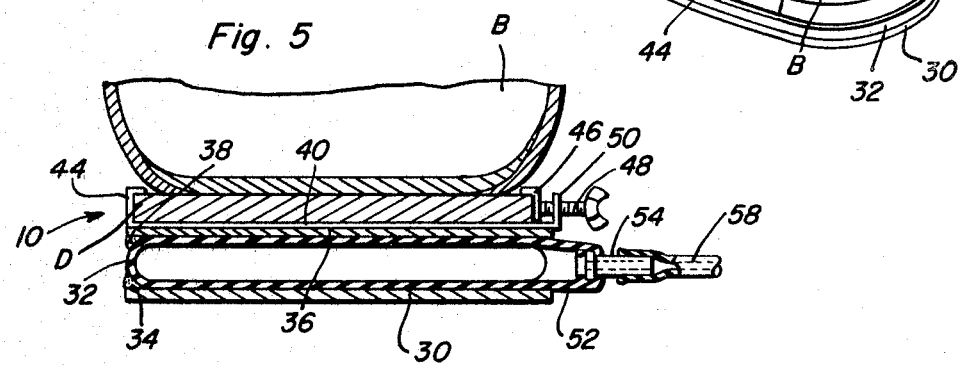
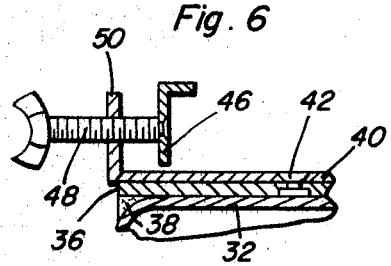
Mitchell Walters
*INVENTOR.*
BY *Clarence A. O'Brien*
*and Harvey B. Jacobson*
Attorneys United States Patent Office 3,305,036
Patented Feb. 21, 1967

3,305,036
**DEVICE FOR MEASURING WEIGHT
DISTRIBUTION ON A FOOT**
Mitchell Walters, Lexington, Ky., assignor of forty-nine
percent to Edgar W. Borchert, Lexington, Ky.
Filed Oct. 14, 1965, Ser. No. 495,868
2 Claims. (Cl. 177—209)

The present invention pertains to a device which is mechanical in character, manually attachable and detachable, is functionally designed and structurally adapted for use by a physician or an orthopedic therapist and which lends itself to practical use when it becomes necessary to measure the weight load concentrated and imposed on a single foot, particularly the heel and sole, of a patient while walking.

The essence of the inventive concept has to do with an apparatus which, as experimental use has repeatedly shown, enables the examining physician or therapist to measure and determine with reasonable accuracy the amount or aggregate of weight exerted on the patient's lower extremity and to appropriate the information for diagnostic purposes of a given foot from the point of heel contact to the toe-off moment, that is the point where the progressively distributed and measured weight is evaluated.

Briefly, the invention is such in construction, use and capability that it enables the diagnostic (physician or therapist) to measure the pressure attending the weight load imposed and concentrated by the heel and sole components of a given foot while taking a step from heel to toe of the effected limb or foot and means for transmitting the measurements thus taken to at least one and preferably two heel and toe pressure gauges. Means is also provided for suspending the gauges from the person of the patient from a readily viewable place say from the upper part of the back of the patient for convenience and studied observation by the therapist as he walks along behind or with the patient and to facilitate taking notes capable of showing an improvement or lack of it and having information at his fingertips, so to speak, for comparison with a chart or suitable averaging norm and using the same for evaluating purposes to guide him (the therapist) in reaching a conclusion and basing his final diagnosis thereon.

In carrying out the principles of the invention the construction and arrangement and coordination of parts are such that the units, heel and sole or toe units, are comparatively simple, light in weight, quite compact and are such that when the device is being used the gait of the wearer is not restricted or noticeably interfered with.

It is within the purview of the inventive concept to incorporate the units in a special purpose shoe worn at the time of the examination of the patient or to, as is generally the case, provide individual units and to equip the same with adapters having clamping means whereby said units can be temporarily clamped on the heel and sole portions of the user's shoe. These units in conjunction with pressure gauges, which are strapped or hooked or otherwise mounted on the patient's back (where the physician or therapist can get an accurate reading) provide an adaptation which well serves the purpose for which it has been perfected and experimentally used.

The invention, whether it be characterized as a device or an apparatus, has been found to be a valuable aid in the instruction of patients when a predetermined or prescribed weight or degree of use of an impaired foot or limb is desirable. It follows that where a limited imposition or direction of force and weight is required insofar as the effective limb is concerned the physician or therapist can see graphically and with reasonable accuracy just how much weight is being borne and can thereafter teach the patient the exact proprioceptive awareness, required in using the affected limbs.

It is also within the purview of the inventive concept to so construct the components and to orient and coordinate them that the resulting measuring device can also be used to satisfaction in measuring muscle strength as well as progress in return of an affected limb to full or, approximately so, use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a view on an enlarged scale showing the two units which go to make up the overall weight responsive means and how they are constructed and clamped in position for use on the heel and sole portions of a substantially conventional shoe;

FIGURE 5 is a section on an enlarged scale taken on the line 5—5 of FIG. 2; and

FIGURE 6 is a fragmentary detail view on an enlarged scale taken on the plane of the section line 6—6 of FIG. 2.

As mentioned briefly and previously the concept has to do with constructing and incorporating the weight responsive measuring means within a shoe. As a general rule, however, it has been found practical and perhaps preferable to provide weight responsive means characterized by individual units which are capable of being applied and removed and in fact used in most instances on the patient's shoe. The shoe is shown in FIG. 2 wherein it will be seen that the counter or heel portion is denoted at A, the toe portion at B, the heel at C and the sole at D (FIG. 5).

Figure 3:
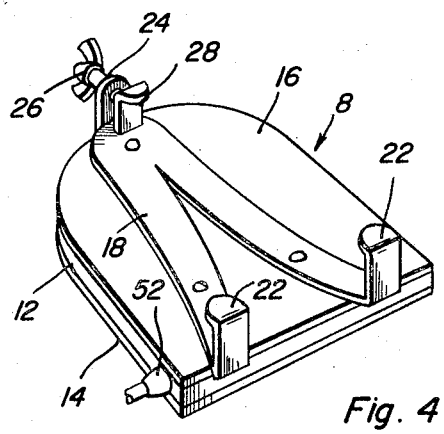
FIGURE 3 is a view in perspective of the heel unit.

The heel and sole weight responsive measuring units are structurally or basically the same in construction. However, and for distinction the heel unit as shown in FIG. 3 is denoted by the numeral 8 while the sole unit denoted in FIGS. 2, 5 and 6 is denoted by the numeral 10.

Figure 4:
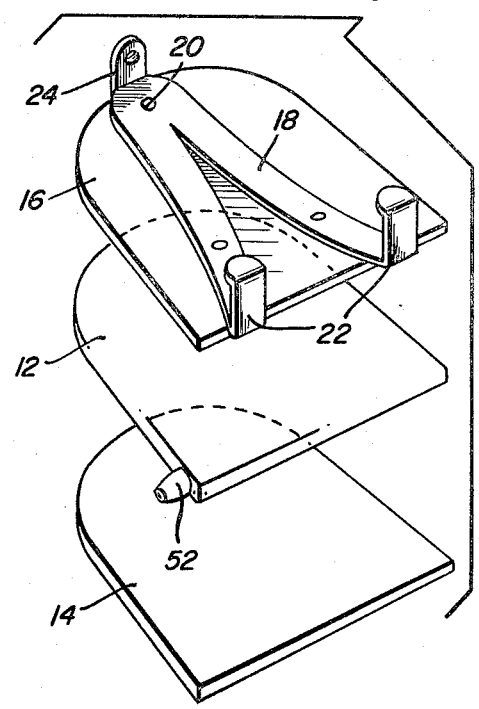
FIGURE 4 is an exploded perspective view of the same unit appearing in FIG. 3.

Taking up first the unit 8 it comprises a rubber or equivalent inflatable and deflatable bag which may be called either an air bag or fluid bag. The term "fluid" is used here to designate air or liquid whichever may be used. Ordinarily, however, in the simple arrangement shown and described the fluid medium is air. The air bag is heel-shaped as at 12 and is sandwiched and fastened or interposed between two plates that is a foundation or base plate 14 is of a corresponding shape and is flat-faced and of thin but firm sheet material. This plate lends itself to practical contact with the floor or other surface on which the walking engaging test is to be made. Any suitable means is employed for fastening the air bag atop the plate 14. The companion upper plate 16 which is conveniently referred to as an adapter plate also corresponds to the heel-shape of the already described parts. It is preferably of sheet metal and fastened on the upper side thereof (as shown in FIGS. 3 and 4) is a V-shaped strap member 18 riveted or otherwise secured in place at 20 and having upstanding hooks 22 which are capable of engaging the forward edge of the heel C of the shoe in the manner shown in FIG. 2. There is a lug 24 at the opposite end of the strap means and this is apertured to accommodate a feed screw 26 having a thumb grip and which serves to operate an adjustable end thrust movable clamping jaw 28. These three jaws or hooks 22 and 28 can be utilized in an obvious manner to apply the unit to the heel of the wearer as shown in FIG. 2.

The sole attachment or device is also much the same in construction and is designated, as a unit, by the numeral 10. It also comprises a flat-faced sole shaped bottom or base plate 30, an air containing inflatable and deflatable rubber equivalent bag or pad 32 secured atop the plate as denoted generally at 34 (FIG. 5). The top plate also corresponds to the shape of the pad and bottom plate and it is denoted at 36 and it is secured in place at 38. In this instance several sole clamps are provided and each comprises a transverse metal or equivalent strap 40 which is applied atop the plate and is riveted in place at 42 and has hook means 44 and 46 at its ends, the hook means 46 being adjustable by a feed screw 48 provided with a thumb grip and threaded through the nut-like lug 50 as evident from both FIGS. 5 and 6. Thus, the two adapter plates lend themselves to ready application and conformable attachment to the surfaces of the heel and sole of the wearer's shoe. The bottom plates rest on the floor or other surface and the bag is between to obtain the desired weight measuring as well as load distributing result. In each instance the inflatable bag is provided on a margin thereof with a suitable nipple 52 to which a fitting 54 is connected (see FIG. 5). The fitting serves to accommodate an end portion of the pressurized fluid transferring or conducting hose or conduit. There are two such hoses and one is designated at 56 this extending from the heel unit, and the other at 58 and extending from the sole unit. These hoses as shown in FIG. 5 have their upper ends connected with their associated branches of either of the two U-shaped yokes, which for convenience of description are denoted at 60. In each instance the yoke is constructed to accommodate a conventional diaphragm-type pressure gauge 62 or 64 as the case may be. Thus, one gauge is for the heel unit and the other for the sole unit. Each yoke is provided with a branch 68 which in turn is provided with a valve 70. Then, too, manually squeezeable vented bulbs 72 and 74 are provided for the respective valved yokes.

Figure 1:
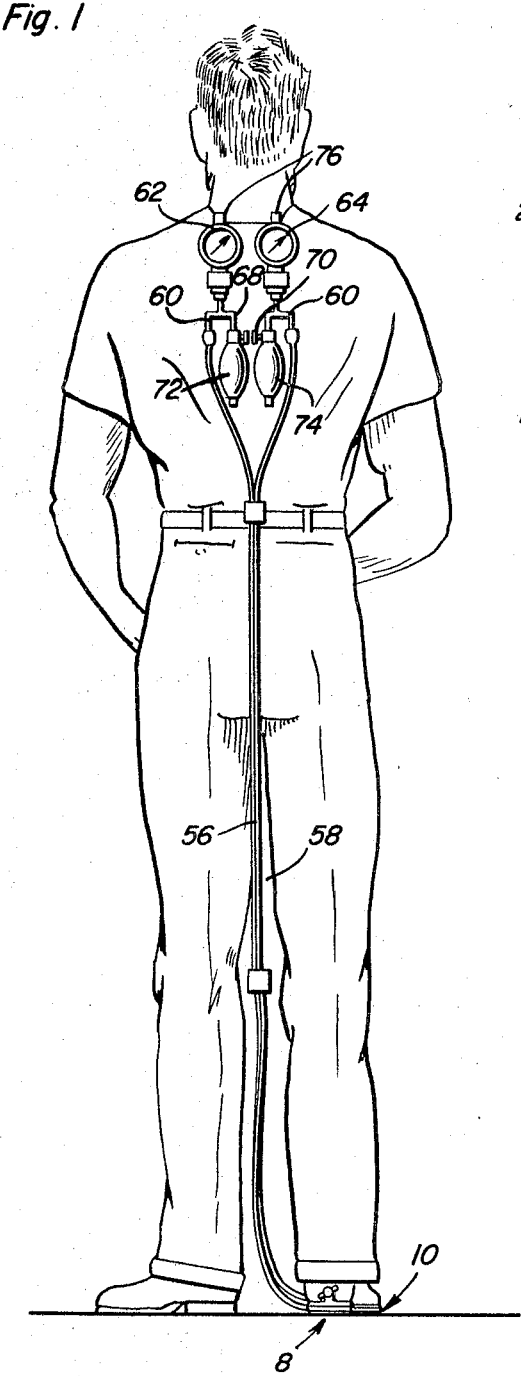
FIGURE 1 is a view showing the apparatus or device constructed in accordance with the principles of the invention and how it is applied to and carried by the patient while the test or diagnosis is being made by the therapist, nurse, or other walking attendant.

It is believed that the construction of the component parts and their arrangement and association insofar as units 8 and 10 are concerned, is clear upon examining the views of the drawings FIGS. 2 to 6, inclusive. The manner of appropriating and using the device is shown in FIG. 1 where it will be evident that the gauges are provided with hooks or similar attaching devices as at 76 which can be hooked over the collar to place the gauges in readable positions.

The gauges have graduated dials and a pointer (not detailed) and in practice the hand or pointer rests on a minus mark when the pad or air bag is deflated. Unscrewing the valve on the inflater bulb releases the air pressure and the indicator hand then rests on a zero mark. When the weight measuring devices for both heel and sole are inflated with approximately six pounds of compressed air, the hand on the dial (not detailed) will come to rest on zero and the apparatus or device is then ready for weighing purposes. Such weight as is imposed on the measuring devices is transmitted by way of the hose lines to the respective gauges and the therapist can see graphically and accurately just how much weight is being borne. With this information in hand he can then teach the patient with respect to the proprioceptive awareness that he, the therapist, regards as required in using the affected limb or foot which is being tested.

It can and should be pointed out here, without going into detail, that either compressed air or fluid, that is, in the sense that it is liquid, can be successfully used in connection with the inflatable and deflatable bags or pads, hose lines and pressurizing bulbs or equivalent simple pump means (not shown).

In conclusion, it is significant to point out that the invention can also be aptly and satisfactorily appropriated for use when the user is called upon to have an implement or tool which lends itself to fitting above-knee prosthetics to help with the anatomical alignment and equally distributing the patient's weight between the metatarsal and the ankle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Means capable of measuring pressure attending an aggregate weight load imposed and concentrated by the heel and sole portions of a patient's foot while walking comprising: a first weight responsive unit attachable to the sole of the shoe of the patient's foot and embodying an inflatable and deflatable pad, a fluid pressure operated gauge having a properly graduated dial capable of being readily viewed by a therapist in charge of and diagnosing the results of the examination under advisement, means carried by said gauge and for suspending the same in an easy-to-see place on the upper part of the body of the walking patient, a flexible hose communicatively connected at its ends to the pad and gauge, respectively, said hose having a manually controllable fluid trapping and bleeding valve, a second weight responsive unit attachable to the heel of the aforementioned shoe and embodying an inflatable and deflatable pad, a second fluid pressure operated gauge having a properly graduated dial and indicator capable of being readily viewed by a therapist in charge of and diagnosing the results of the examination under advisement, means carried by said second gauge and for suspending the same in an easy-to-see place on the upper part of the body of the walking patient, and a second flexible hose communicatively connected at its ends to the second pad and second gauge, respectively, said second hose having a manually controllable fluid trapping and bleeding valve.

2. The structure according to claim 1 and wherein each unit comprises, in addition to said pad, a base plate atop which said pad is mounted, an adapter plate mounted atop said pad, and clamping means carried by said adapter plate for securing the same, as well as the base plate and pad, beneath a predetermined portion of the wearer's foot.

References Cited by the Examiner

UNITED STATES PATENTS

| 2,095,268 | 10/1937 | Roberts | 172—209 |
| 3,217,818 | 11/1965 | Engelsher et al. | 177—144 |

FOREIGN PATENTS

| 991,552 | 6/1951 | France. |
| 1,167,254 | 7/1958 | France. |

RICHARD B. WILKINSON, *Primary Examiner.*

G. H. MILLER, *Assistant Examiner.*